(12) United States Patent
Yoshiura (10) Patent No.: US 6,785,017 B1
(45) Date of Patent: Aug. 31, 2004

(54) FACSIMILE APPARATUS AND FACSIMILE SYSTEM

(75) Inventor: Yoshio Yoshiura, Ninomiyamachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 09/643,930

(22) Filed: Aug. 23, 2000

(30) Foreign Application Priority Data

Aug. 26, 1999 (JP) .......................................... 11-240317

(51) Int. Cl.$^7$ .......................... G06F 15/00; H04N 1/00; G01D 11/00
(52) U.S. Cl. ...................... 358/1.15; 358/405; 358/406; 358/437; 358/439; 358/504; 347/100.08; 347/100.09; 347/100.1; 347/100.11; 347/100.12; 347/100.13; 347/100.14; 347/100.15
(58) Field of Search ...................... 347/100.08–100.15; 358/405, 406, 437, 439, 504, 1.15

(56) References Cited

U.S. PATENT DOCUMENTS

| | | | | |
|---|---|---|---|---|
| 5,031,179 A | * | 7/1991 | Yoshida et al. | 714/748 |
| 5,805,298 A | * | 9/1998 | Ho et al. | 358/402 |
| 6,094,277 A | * | 7/2000 | Toyoda | 358/1.15 |
| 6,101,244 A | * | 8/2000 | Okada | 379/100.08 |
| 6,229,884 B1 | * | 5/2001 | Toyoda et al. | 379/100.08 |
| 6,351,316 B2 | * | 2/2002 | Saito et al. | 358/1.15 |
| 6,493,103 B2 | * | 12/2002 | Toyoda et al. | 358/1.15 |

* cited by examiner

Primary Examiner—Edward Coles
Assistant Examiner—Chan S. Park
(74) Attorney, Agent, or Firm—Fitzpatrick, Cella, Harper & Scinto

(57) ABSTRACT

This invention provides a facsimile apparatus having an E-mail transmission/reception function, which can correctly transmit the contents of a file attached to E-mail even when the file cannot be opened on the other party side. A document file as a file attached to E-mail is transmitted from a transmitting facsimile apparatus and received by a receiving facsimile apparatus. If the attached file cannot be normally opened by viewer software or another application of the facsimile apparatus, the apparatus transmits, as a reply to the received E-mail, an error message containing contents representing that the error has occurred, and a facsimile number to be used by the other party for retransmission to the transmitting facsimile apparatus. When the received E-mail contains an error message, the transmitting facsimile apparatus searches for the attached file to be retransmitted by referring to, e.g., the mail title or mail text. The transmitting facsimile apparatus converts the contents of the attached file into an image and retransmits it to the receiving side in accordance with the normal facsimile transmission procedure.

12 Claims, 5 Drawing Sheets

FACSIMILE APPARATUS AND FACSIMILE SYSTEM

FIELD OF THE INVENTION

The present invention relates to a facsimile apparatus having an E-mail (Electronic mail) transmission/reception function through a computer network such as the Internet or LAN and, more particularly, to a facsimile apparatus having a specific feature in handling a file attached to E-mail.

BACKGROUND OF THE INVENTION

At present, people often attach document files to E-mail messages instead of creating documents by computers and printing them, and transmitting them by facsimile.

However, when a file is attached and transmitted by a personal computer (PC) or facsimile apparatus having an E-mail function, the receiving apparatus cannot open the contents unless the file formats do not match. Eventually, although the mail can be received, information cannot be transmitted.

In this case, additionally, since the mail transmitting side cannot confirm, as a procedure, file formats processible on the receiving side, and mail transmission itself terminates normally, the transmitting side tends to understand that the receiving side has received the file and read its contents.

The present invention has been made in consideration of the problems of the prior art, and has as its object to provide a facsimile apparatus having an E-mail transmission/reception function and capable of correctly transmitting the contents of a file attached to E-mail even when the file cannot be opened on the receiving side.

SUMMARY OF THE INVENTION

More specifically, according to an aspect of the present invention, there is provided a facsimile apparatus having facsimile communication means for performing facsimile communication through a public switched telephone network (PSTN), and data communication means for performing data communication through a computer network, characterized by comprising error detection means for detecting that a data file received by data communication cannot be normally rasterized or reconstructed to a correct state, and retransmission request means for sending a retransmission request message to a transmission source of the data file in response to detection by the error detection means so as to request the transmission source to retransmit, by facsimile communication through the public switched telephone network, the data file received by data communication.

According to another aspect of the present invention, there is provided a facsimile apparatus having facsimile communication means for performing facsimile communication through a public switched telephone network, and data communication means for performing data communication through a computer network, characterized by comprising retransmission request detection means for detecting whether a retransmission request message has been received in correspondence with a data file transmitted by data communication, and retransmission control means for, in correspondence with detection of the retransmission request message, generating image data in which the data file is correctly rasterized or reconstructed, and transmitting the image data to a transmission source of the retransmission request message by facsimile communication.

According to still another aspect of the present invention, there is provided a facsimile system characterized in that the above-described facsimile apparatuses are connected through a public switched telephone network and/or a computer network.

According to still another aspect of the present invention, there is provided a computer-readable storage medium which stores a program for controlling a facsimile apparatus having facsimile communication means for performing facsimile communication through a public switched telephone network, and data communication means for performing data communication through a computer network, characterized by comprising the program of the error detection step of detecting that a data file received by data communication cannot be normally rasterized or reconstructed to a correct state, and the program of the retransmission request step of sending a retransmission request message to a transmission source of the data file in response to detection in the error detection step so as to request the transmission source to retransmit, by facsimile communication through the public switched telephone network, the data file received by data communication.

According to still another aspect of the present invention, there is provided a computer-readable storage medium which stores a program for controlling a facsimile apparatus having facsimile communication means for performing facsimile communication through a public switched telephone network, and data communication means for performing data communication through a computer network, characterized by comprising the program of the retransmission request detection step of detecting whether a retransmission request message has been received in correspondence with a data file transmitted by data communication, and the program of the retransmission control step of, in correspondence with detection of the retransmission request message, generating image data in which the data file is correctly rasterized or reconstructed, and transmitting the image data to a transmission source of the retransmission request message by facsimile communication.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

(Hardware Configuration)

Figure 1:
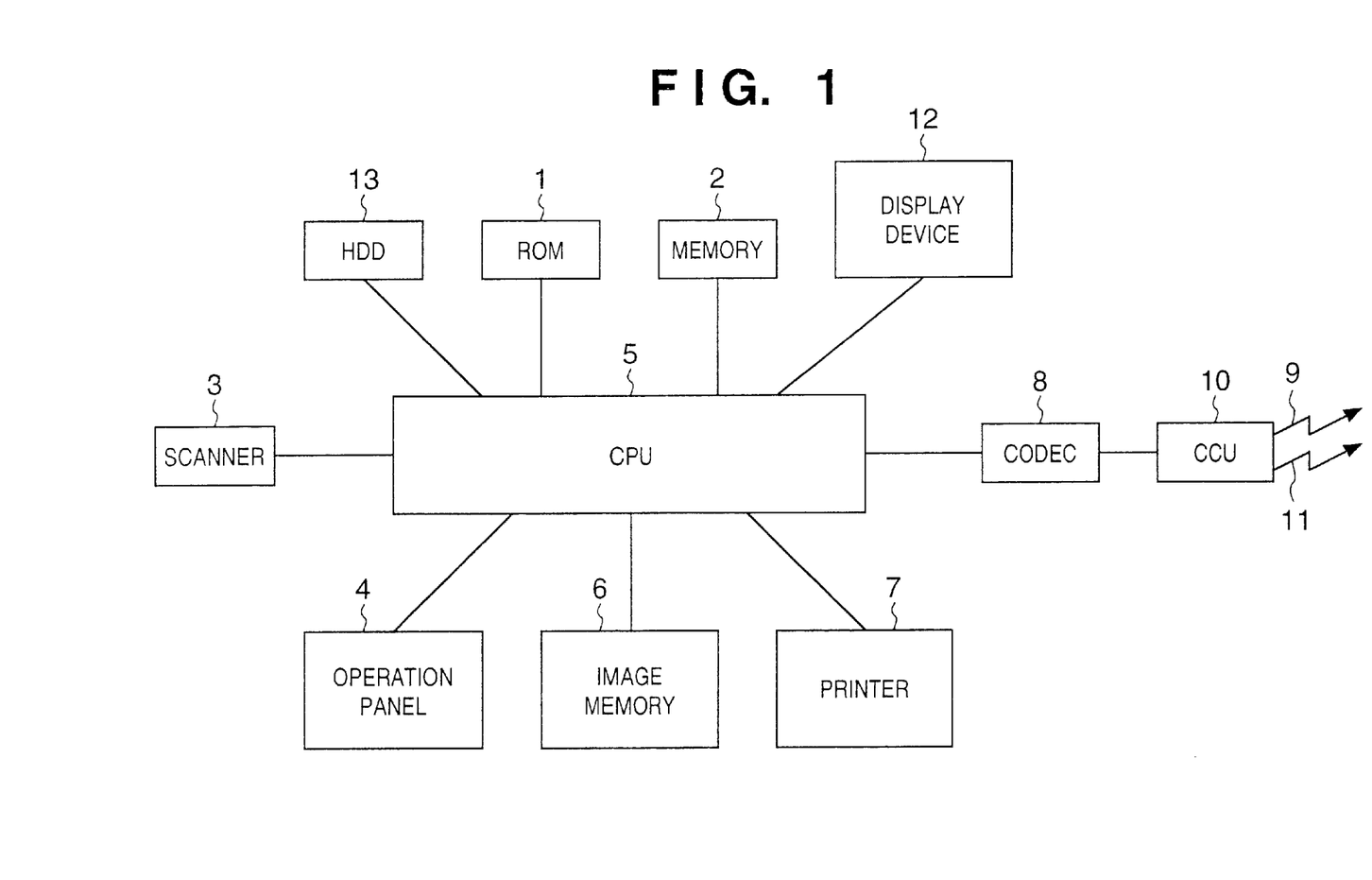
FIG. 1 is a block diagram showing the arrangement of a facsimile apparatus according to an embodiment of the present invention.

FIG. 1 is a block diagram showing the arrangement of a facsimile apparatus according to an embodiment of the present invention. Referring to FIG. 1, reference numeral 1 denotes a ROM storing software for controlling the operation of the facsimile apparatus; 2, working memory for software processing and temporary data storage; 3, a scanner for inputting a transmission image; 4, an operation panel comprising operation keys including dial keys to instruct or set an operation for the facsimile apparatus; 5, a CPU for controlling various units of the facsimile apparatus in accordance with the software stored in the ROM 1; 6, a memory 6 for storing image data; 7, a printer unit for outputting a received image; 8, a CODEC for compressing a transmission image or decompressing a received image; 9, a public switched telephone network; 10, a CCU (Communication Control Unit); 11, the Internet or a LAN network; 12, a display device for displaying Internet information or a file; and 13, a large-capacity storage device such as a hard disk drive (HDD) storing software for opening attached files (It also may include a facility of ROM 1 which provides software of facsimile control and memory 6 which stores image data). It should be noted that HDD 13 is optional. If the facsimile apparatus does not have HDD 13, the software for opening attached files may be stored in ROM 1 and/or battery-backed up portion of RAM 2.

The facsimile apparatus shown in FIG. 1 may be a general-purpose computer apparatus connected to the scanner 3 and printer 7, connectable to the public switched telephone network 9 and Internet or LAN network 11, and capable of facsimile communication and data communication through these networks. In the case that the facsimile apparatus constructed based on the general purpose computer apparatus, HDD 13 is normal system component. Therefore, HDD 13 may be used as memory 6 and ROM 1 of the non-computer-apparatus-based facsimile apparatus.

(Outline of Processing)

Figure 2:
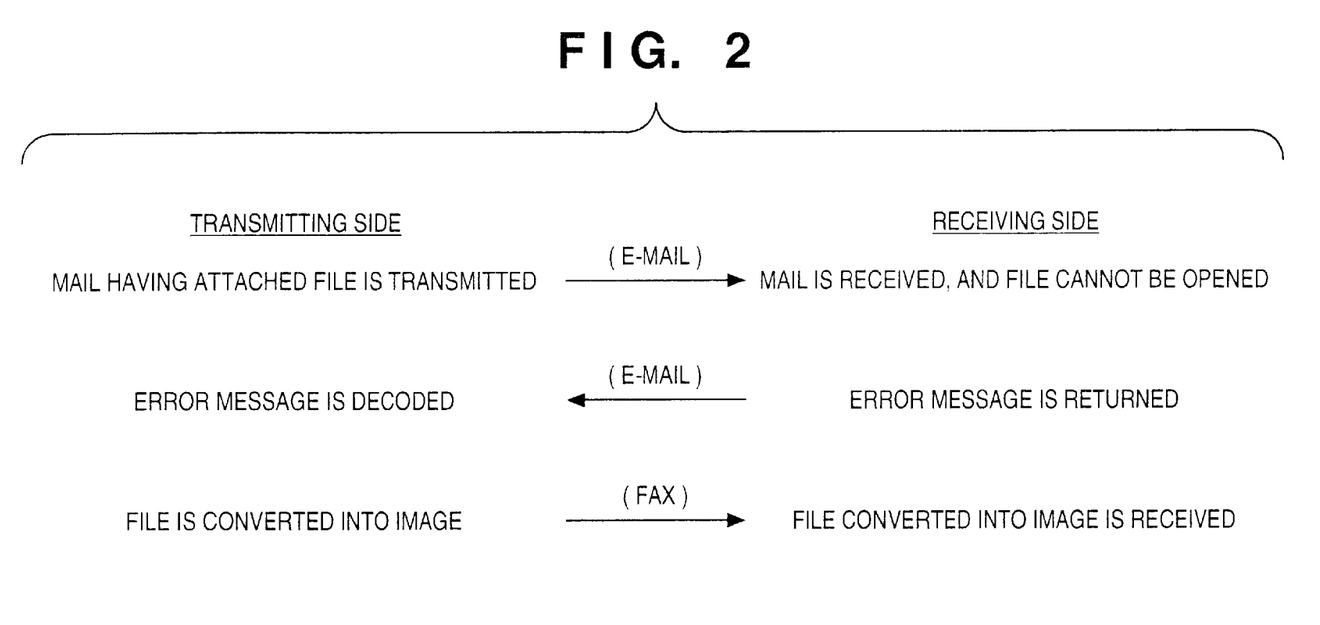
FIG. 2 is a view showing an outline of attached file retransmission processing using the facsimile apparatus according to the embodiment of the present invention.

FIG. 2 is a view showing an outline of transmission/reception processing by the facsimile apparatus according to the present invention. More specifically, a document file as a file attached to E-mail is transmitted from a transmitting facsimile apparatus and received by a receiving facsimile apparatus.

If the attached file cannot be normally opened by viewer software or another application of the facsimile apparatus, the apparatus transmits to the transmitting facsimile apparatus, as a reply to the received E-mail, an error message containing contents representing that an error has occurred, and a facsimile dialing number to be used by the other party for retransmission.

When the received E-mail contains an error message, the transmitting facsimile apparatus searches for the attached file to be retransmitted by referring to, e.g., the mail title or mail contents. The transmitting facsimile apparatus converts the messages of the attached file into an image and retransmits it to the receiving side in accordance with the normal facsimile transmission procedure.

With this procedure, even when the received attached file cannot be correctly opened, the communication messages can be correctly transmitted to the other party.

(Transmission/reception Operation)

Next, the E-mail transmission/reception operation of the facsimile apparatus according to the present invention will be described in more detail with reference to the flow charts shown in FIGS. 3 and 4. In the following description, assume that the facsimile apparatus of the present invention is used as both the transmitting and the receiving apparatuses.

Figure 3:
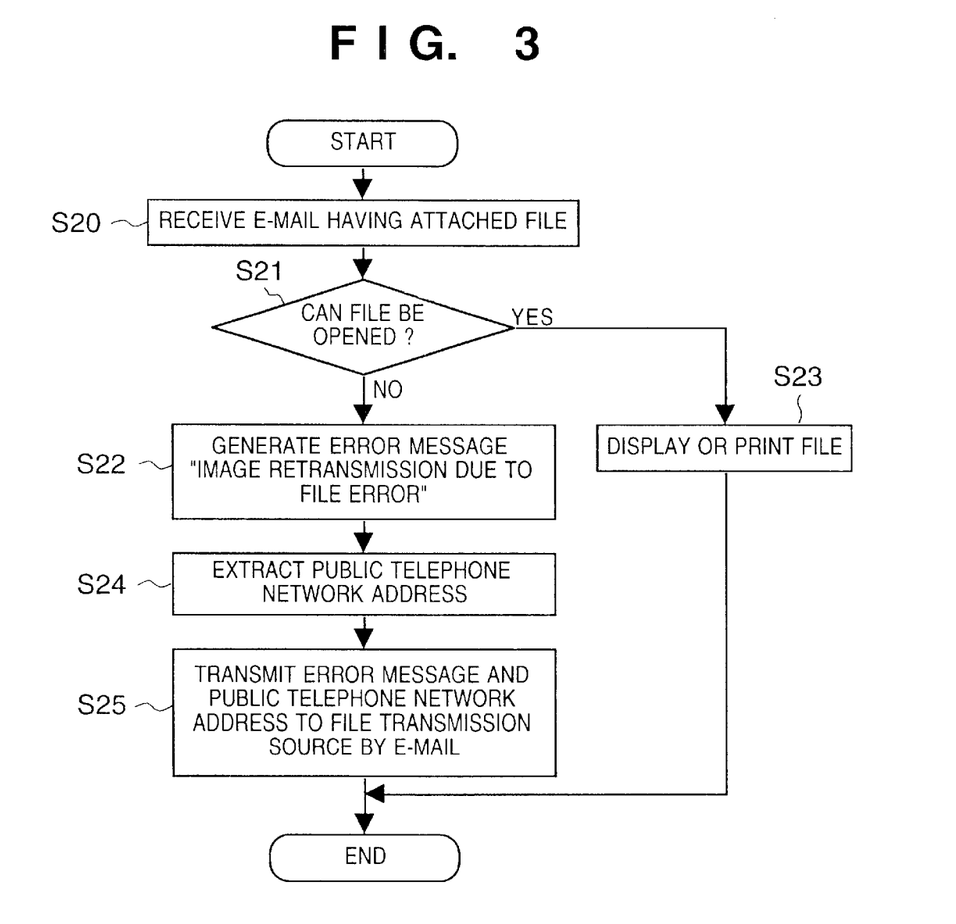
FIG. 3 is a flow chart showing the reception operation of the facsimile apparatus according to the embodiment of the present invention.

FIG. 3 is a flow chart showing the operation of the receiving facsimile apparatus.

First, an attached file is received in step S20, and processing of opening the attached file is performed in step S21. This processing can be automatically performed by the facsimile apparatus, or manually performed after the user confirms mail reception. One of these methods is selected by predetermined setting.

When the attached file is opened in step S21, the file data is output to the screen (display device 12) or printer 7 in step S23. If the attached file cannot be opened, a predetermined error message "retransmission request due to file format error" is generated in step S22, and the public telephone network address (e.g., the telephone number: 0297-33-xxxx in this embodiment) of its own, which is stored in the storage device such as the Memory 2 (which is desirable to have a battery-back up means) is extracted in step S24. A message containing "retransmission request due to file format error" and 0297-33-xxxx is returned to the file transmission source by E-mail (step S25).

Figure 4:
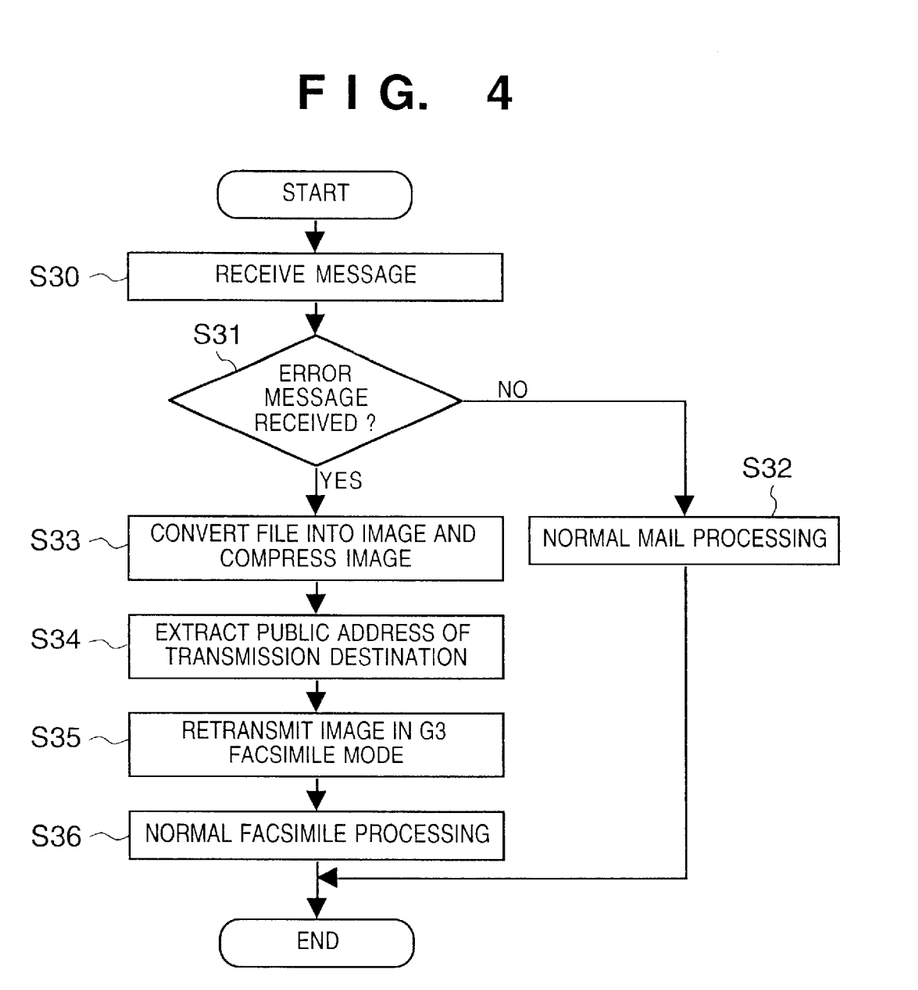
FIG. 4 is a flow chart showing the transmission operation of the facsimile apparatus according to the embodiment of the present invention.

FIG. 4 is a flow chart showing the operation of the transmitting facsimile apparatus.

First, a mail message is received in step S30, and it is checked in step S31 whether this mail message corresponds to "image retransmission due to file error". If NO in step S31, normal mail reception processing is performed in step S32. If YES in step S31, the flow advances to step S33 to search for the corresponding file on the basis of the received mail contents (e.g., the mail address of the transmission source, mail title, or public telephone network address). For example, the file is opened and then converted into an image.

If the image is uncompressed the image can be converted by the CODEC 8 into a compression code that can be negotiated in the subsequent facsimile communication procedure in accordance with ITU-T Recommendation T-30, so the image can be optimally compressed. To omit this procedure, the image may be compressed by MH at the standard resolution of 200×100 pels/25.4 mm, which always enables reception.

In step S34, the public telephone network address (0297-33-xxxx) is extracted from the error message, and normal facsimile transmission is started in step S35. After that, normal facsimile processing is performed in step S36.

(File Open by Manual Operation)

A reception procedure of manually opening a received file will be described with reference to the flow chart shown in FIG. 5.

First, when the reception terminal receives an attached file in step S40 and cannot automatically open the file because of, e.g., the absence of file extension, processing of manually opening the file is performed in step S41. More specifically, the user can open the file using several applications, or forcibly open the file using a program such as an Editor, check the name of application used to generate the file, and then open the file using the corresponding application or an application having a converter therefor.

It is determined in step S42 whether the file could be opened in step S41. This determination is done by the user who presses a predetermined one of the operation keys when he/she determines that the file cannot be opened, thereby notifying the facsimile apparatus of it. Alternatively, a dialogue is displayed on the display device 12 to inquire the user about whether processing is to be ended when the file cannot be opened even after the elapse of a predetermined time and prompt the user to select a mode.

When the file could be correctly opened, the flow advances to step S43 to output the file data to the screen (display device 12) or printer 7. When the file cannot be opened, it is checked in step S44 whether a retransmission request is necessary to request the transmitting side to convert the data into an image and retransmit it. If YES in step S44, the flow advances to step S45. If NO in step S44, the processing is ended. Whether the retransmission request is necessary can be determined by the user on a displayed selection dialogue in step S44. Alternatively, whether retransmission processing is to be automatically performed may be set by predetermined initial condition setting.

When retransmission processing to be performed, the same processing as that from step S22 in FIG. 3 is performed. More specifically, an error message "retransmission request due to file format error" is generated in step S45, the public telephone network address (0297-33-xxxx) connected to this terminal is extracted in step S46, and "image retransmission due to file error" and 0297-33-xxxx are generated as contents of a message and returned to the file transmission source by E-mail in step S47.

The operation of the facsimile apparatus that has received this mail message is the same as that shown in FIG. 4. The contents of a DIS (Digital Identification Signal) representing the reception function of the facsimile apparatus may be attached to the E-mail of the retransmission request. When the DIS is attached, retransmission can be performed using optimum conditions.

(Other Embodiments)

In the above-described embodiment, error information is transmitted as an E-mail message. However, when an error is defined as a parameter of MDN (Message Disposition Notification) for transmitting information from a terminal by the Internet procedure, and a telephone number and a DIS parameter as a facsimile are added, the reception ability can also be transmitted to the file transmission source. In this case, an image can be efficiently converted and compressed.

The present invention can be applied to an Internet facsimile apparatus by using an E-mail address as the public telephone network address in step S24 or S46 and replacing the G3 facsimile communication in step S35 and S36 with the Internet facsimile procedure as far as the facsimile apparatus can transmit image data as an attached file of E-mail.

In this case, as the resolution and the type of compression code, MH as the basic function, which corresponds to 200×100 pels/25.4 mm is used. Alternatively, when capability negotiation is possible, optimum compression is performed by the negotiation procedure.

As another application, when a G4 facsimile function is used in place of the G3 facsimile function, G4 facsimile transmission is performed in place of step S35. In this case, ISDN number will be used in stead of PSTN address in step S34.

When, instead of directly connecting E-mail transmission to the Internet such as LAN, a telephone line is used for connecting to a provider as so called dial-up connection, one telephone line can be shared for both facsimile and Internet communication as the interface of the CCU 10 shown in FIG. 1.

The error message can employ any format as long as it can describe error contents, public network address such as a telephone number, and reception ability in association with each other. When minimum syntax and rules are defined in-advance, information extraction processing can be facilitated.

The syntax and rules can be added as MDN parameters as far as they use syntax that can be uniquely defined.

For example, to return a message, generally used "Re:" is added, the original title is directly used, or a specific symbol sequence which is not used for normal mail is used as a title, thereby easily specifying the attached file to be retransmitted.

If the attached files of a plurality of E-mail messages from the same transmission source cannot be opened, time stamp information contained in the header of the E-mail is added to the error message. In this case, the retransmission file can be easily specified in the transmission source.

Files cannot be opened also when characters are garbled due to differences in software between the transmitting and receiving facsimile apparatuses (for example, between the Japanese version and the English version of the same application). In such case, since a received file can be automatically converted, no error message is automatically returned in the automatic file open mode even if characters are not reproduced correctly. In this case, the user must manually return an error message from a printout or screen display.

As described above, the present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium (or recording medium) storing software program codes for realizing the functions of the above-described embodiment to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Figure 5:
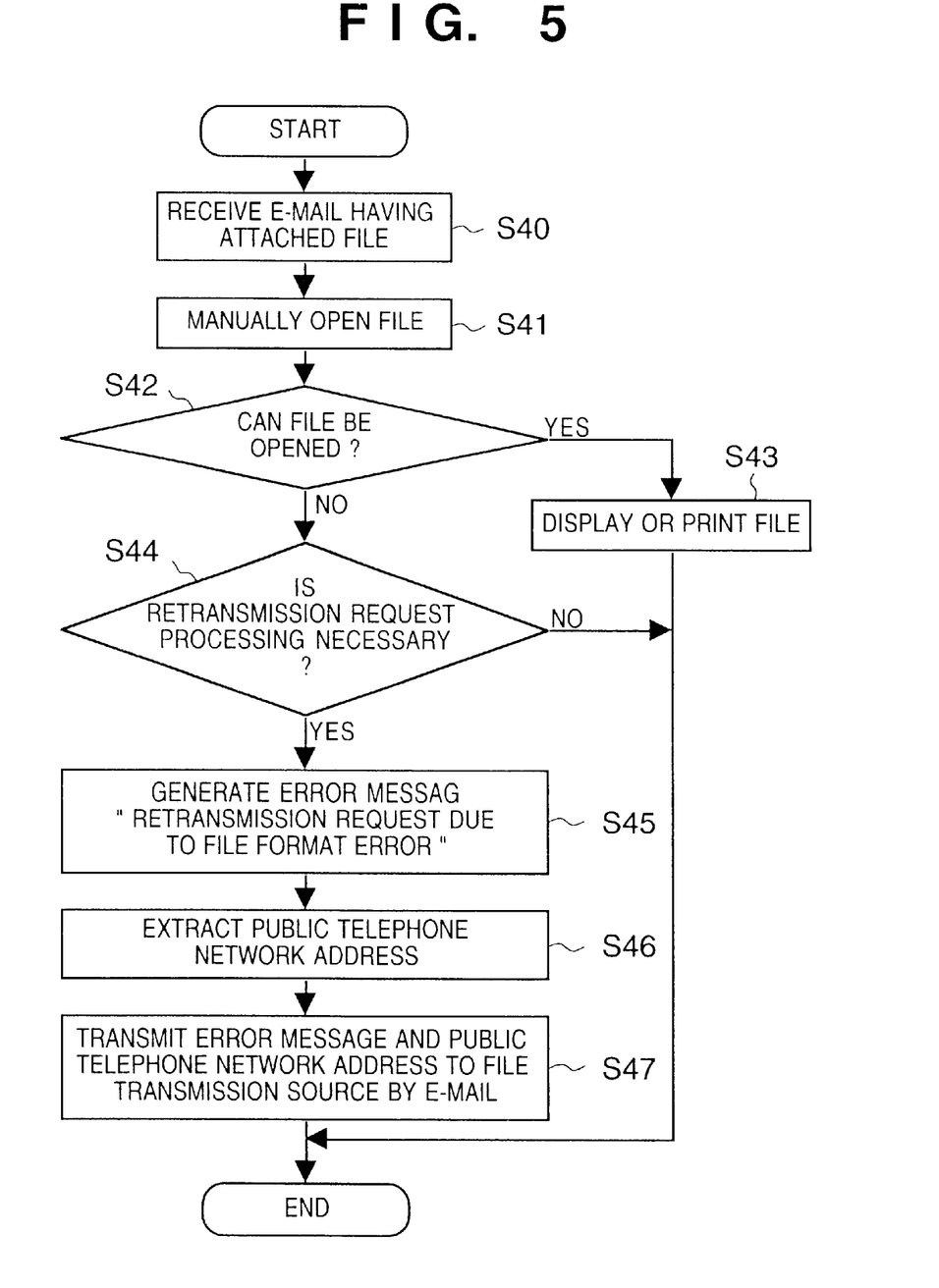
FIG. 5 is a flow chart showing an operation of manually opening a file in FIG. 3.

When the present invention is applied to the storage medium, it stores program codes corresponding to the above-described flow chart (shown in one of FIG. 3 to 5).

As has been described above, according to the present invention, the facsimile apparatus capable of transmitting/receiving E-mail is designed to return a retransmission request for requesting retransmission by facsimile communication when the attached file cannot be normally opened. For this reason, even when the attached file can be normally received, and the contents cannot be confirmed on the receiving side, the contents of the file can be properly transmitted or received.

In addition, since a document can be transmitted by both E-mail and the public telephone network, a more reliable facsimile apparatus can be implemented. Also, the apparatus is economical because the Internet with low communication cost can be used in place of the facsimile.

Furthermore, when information related to the capability of the receiver is contained in the retransmission request mail, or a function of enabling transmission/reception of a predetermined error code is added, a file can be converted into an optimum image and transmitted at a high speed.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus having facsimile communication means for performing facsimile communication through a public telephone network or ISDN (Integrated Service Digital Network), and data communication means for performing data communication through a computer network, comprising:

error detection means for detecting that a data file received by data communication cannot be normally rasterized or reconstructed to a correct state; and retransmission request means for sending a retransmission request message to a transmission source of the data file in response to detection by said error detection means so as to request the transmission source to retransmit, by facsimile communication through the public telephone network or ISDN, the data file received by data communication.

2. The apparatus according to claim 1, further comprising:

display means for displaying the received data file; and operation means for instructing said facsimile apparatus to perform processing of rasterizing or reconstructing the data file.

3. The apparatus according to claim 1, wherein the retransmission request message contains address information of said facsimile apparatus, which is to be used by the transmission source for retransmission.

4. The apparatus according to claim 1, wherein the retransmission request message contains MDN data representing error contents.

5. The apparatus according to claim 1, wherein the retransmission request message contains information representing a reception function of a facsimile apparatus which has issued the retransmission request.

6. A facsimile apparatus having facsimile communication means for performing facsimile communication through a public telephone network or ISDN, and data communication means for performing data communication through a computer network, comprising:

retransmission request detection means for detecting whether a retransmission request message has been received in correspondence with a data file transmitted by data communication; and retransmission control means for, in correspondence with detection of the retransmission request message, generating image data in which the data file is correctly rasterized or reconstructed, and transmitting the image data to a transmission source of the retransmission request message by facsimile communication.

7. The apparatus according to claim 6, wherein said facsimile apparatus further comprises retransmission destination information extraction means for extracting, from the retransmission request message, address information to be used for retransmission to a facsimile apparatus as the transmission source of the retransmission request message, and said retransmission control means performs facsimile communication using the address information.

8. The apparatus according to claim 1, wherein said facsimile apparatus is connected to the computer network through the public telephone network or ISDN.

9. The apparatus according to claim 1, wherein said facsimile apparatus is directly connected to the computer network.

10. A facsimile system wherein said facsimile apparatus of claim 1 and said facsimile apparatus of claim 6 are connected through a public telephone network or ISDN and/or a computer network.

11. A computer-readable storage medium which stores a program for controlling a facsimile apparatus having facsimile communication means for performing facsimile communication through a public telephone network or ISDN, and data communication means for performing data communication through a computer network, comprising:

the program of the error detection step of detecting that a data file received by data communication cannot be normally rasterized or reconstructed to a correct state; and the program of the retransmission request step of sending a retransmission request message to a transmission source of the data file in response to detection in the error detection step so as to request the transmission source to retransmit, by facsimile communication through the public telephone network or ISDN, the data file received by data communication.

12. A computer-readable storage medium which stores a program for controlling a facsimile apparatus having facsimile communication means for performing facsimile communication through a public telephone network or ISDN, and data communication means for performing data communication through a computer network, comprising:

the program of the retransmission request detection step of detecting whether a retransmission request message has been received in correspondence with a data file transmitted by data communication; and the program of the retransmission control step of, in correspondence with detection of the retransmission request message, generating image data in which the data file is correctly rasterized or reconstructed, and transmitting the image data to a transmission source of the retransmission request message by facsimile communication.

* * * * *

UNITED STATES PATENT AND TRADEMARK OFFICE
CERTIFICATE OF CORRECTION

| | |
|---|---|
| PATENT NO. | : 6,785,017 B1 |
| APPLICATION NO. | : 09/643930 |
| DATED | : August 31, 2004 |
| INVENTOR(S) | : Yoshio Yoshiura |

It is certified that error appears in the above-identified patent and that said Letters Patent is hereby corrected as shown below:

ON TITLE PAGE AT (75) INVENTORS

"Yoshio Yoshiura, Ninomiyamachi (JP)" should read --Yoshio Yoshiura, Nakagun (JP)--.

SHEET 5

FIG. 5, "MESSAG" should read --MESSAGE--.

COLUMN 1

Line 19, "do not match" should read --match--; and
Line 31, "to" should read --to an--.

COLUMN 3

Line 31, "that" should read --of--; and
Line 33, "is" should read --is a--.

COLUMN 4

Line 32, "uncompressed" should read --uncompressed,--;
Line 62, "to inquire the" should read --inquiring with the--; and
Line 63, "about" should be deleted.

UNITED STATES PATENT AND TRADEMARK OFFICE
CERTIFICATE OF CORRECTION

PATENT NO. : 6,785,017 B1
APPLICATION NO. : 09/643930
DATED : August 31, 2004
INVENTOR(S) : Yoshio Yoshiura

It is certified that error appears in the above-identified patent and that said Letters Patent is hereby corrected as shown below:

COLUMN 5

Line 10, "to be" should read --is--;
Line 50, "in stead" should --instead--; and
Line 62, "in-advance" should read --in advance--.

Signed and Sealed this

Twenty-fourth Day of July, 2007

JON W. DUDAS
*Director of the United States Patent and Trademark Office*